(12) United States Patent
Takeuchi et al.

(10) Patent No.: US 12,049,300 B2
(45) Date of Patent: Jul. 30, 2024

(54) ELECTRO-HYDROSTATIC CIRCUIT AND AIRCRAFT

(71) Applicants: MITSUBISHI HEAVY INDUSTRIES, LTD., Tokyo (JP); NABTESCO CORPORATION, Tokyo (JP)

(72) Inventors: Motoyasu Takeuchi, Tokyo (JP); Toshinori Abe, Tokyo (JP); Kazuyuki Suzuki, Tokyo (JP); Hideki Niwa, Tokyo (JP)

(73) Assignees: MITSUBISHI HEAVY INDUSTRIES, LTD., Tokyo (JP); NABTESCO CORPORATION, Tokyo (JP)

( * ) Notice: Subject to any disclaimer, the term of this patent is extended or adjusted under 35 U.S.C. 154(b) by 105 days.

(21) Appl. No.: 17/794,488

(22) PCT Filed: Dec. 17, 2020

(86) PCT No.: PCT/JP2020/047102
§ 371 (c)(1),
(2) Date: Jul. 21, 2022

(87) PCT Pub. No.: WO2021/149415
PCT Pub. Date: Jul. 29, 2021

(65) Prior Publication Data
US 2023/0090110 A1    Mar. 23, 2023

(30) Foreign Application Priority Data
Jan. 23, 2020 (JP) .................................. 2020-009471

(51) Int. Cl.
*B64C 13/50* (2006.01)
*F15B 11/08* (2006.01)
*B64C 27/72* (2006.01)

(52) U.S. Cl.
CPC ............ *B64C 13/504* (2018.01); *F15B 11/08* (2013.01); *B64C 2027/7272* (2013.01)

(58) Field of Classification Search
CPC ............................... B64C 13/504; F15B 11/08
See application file for complete search history.

(56) References Cited

FOREIGN PATENT DOCUMENTS

| JP | 51-39832 | | 3/1976 |
|---|---|---|---|
| JP | 114027/1974 | * | 3/1976 |

(Continued)

OTHER PUBLICATIONS

International Search Report issued Feb. 16, 2021 in International (PCT) Application No. PCT/JP2020/047102, with English-language translation.

(Continued)

*Primary Examiner* — Justin M Benedik
(74) *Attorney, Agent, or Firm* — WENDEROTH, LIND & PONACK, L.L.P.

(57) ABSTRACT

An electro-hydraulic circuit includes a supply line that connects between a hydraulic supply device that supplies hydraulic fluid and a driving part to be driven by a hydraulic pressure of the hydraulic fluid; a switching valve disposed in the supply line to switch between switching lines for the hydraulic fluid supplied to the driving part; a pilot hydraulic line connected to the switching valve to supply the hydraulic fluid for switching between the switching lines; a check valve disposed in the pilot hydraulic line; a solenoid valve disposed in the pilot hydraulic line to change a supply state of the hydraulic fluid to the switching valve; a sealing material disposed in the switching valve to seal the hydraulic fluid; and a relief valve disposed in the pilot hydraulic line to release the pilot hydraulic pressure

4 Claims, 2 Drawing Sheets

(56) References Cited

FOREIGN PATENT DOCUMENTS

| | | | |
|---|---|---|---|
| JP | 2004-100727 | | 4/2004 |
| JP | 2004100727 | * | 4/2004 |
| JP | 2007-46790 | | 2/2007 |

OTHER PUBLICATIONS

Written Opinion of the International Searching Authority issued Feb. 16, 2021 in International (PCT) Application No. PCT/JP2020/047102, with English-language translation.

* cited by examiner

ELECTRO-HYDROSTATIC CIRCUIT AND AIRCRAFT

FIELD

The present invention relates to an electro-hydrostatic circuit and an aircraft.

BACKGROUND

Regarding an electro-hydrostatic actuator mounted on a control surface of an aircraft, there is known an electro-hydrostatic circuit configured to switch operation modes such as a normal mode, a bypass mode, and a damping mode depending on a situation, as in Japanese Patent Application Laid-open No. 2007-46790. The electro-hydrostatic circuit includes a switching valve for switching a line for hydraulic fluid supplied to the actuator in accordance with the operation mode of the actuator. By switching the line, the operation mode of the actuator is switched.

Electro-hydrostatic circuits typically include a solenoid valve that switches a line of a switching valve by using energizing force of an elastic body and electromagnetic force of a solenoid against the energizing force. However, an output from the solenoid is required to be larger than the energizing force of the elastic body, so that power consumption and the weight of the solenoid are increased. As a method of switching the line of the switching valve, there is known a method of using a hydraulic pressure by pilot hydraulic pressure and energizing force of the elastic body against the hydraulic pressure. Such a method can suppress increase in power consumption and the weight as compared with the method of using the solenoid valve. However, the line may be unintentionally switched due to pressure variations in the pilot hydraulic pressure for switching the line of the switching valve, so that there is a need for preventing the operation mode of the actuator from being unintentionally switched.

The present invention is made in view of such a situation, and provides a lightweight electro-hydrostatic circuit and aircraft that can switch a switching line of a switching valve with low power consumption.

SUMMARY OF THE INVENTION

An electro-hydrostatic circuit according to the present invention includes: a supply line that connects between a hydraulic supply device that supplies hydraulic fluid and a driving part to be driven by a hydraulic pressure of the hydraulic fluid supplied from the hydraulic supply device; a switching valve that is disposed in the supply line to switch between a plurality of switching lines for the hydraulic fluid supplied to the driving part; a pilot hydraulic line that is connected to the switching valve to supply the hydraulic fluid with a pilot hydraulic pressure for switching between the switching lines in the switching valve; a check valve that is disposed in the pilot hydraulic line; a solenoid valve that is disposed in the pilot hydraulic line on a downstream side of the check valve in a circulating direction of the hydraulic fluid to change a supply state of the hydraulic fluid to the switching valve; a sealing material that is disposed in the switching valve to seal the hydraulic fluid with the pilot hydraulic pressure; and a relief valve that is disposed in the pilot hydraulic line on a downstream side of the check valve in the circulating direction to release the pilot hydraulic pressure of the pilot hydraulic line.

With this configuration, the pilot hydraulic pressure is used for switching the switching valve, and supply of the pilot hydraulic pressure is controlled by the solenoid valve, so that the solenoid valve can be downsized as compared with a case of directly using the solenoid valve for switching the switching valve. Accordingly, the weight of the entire electro-hydrostatic circuit can be reduced, and power consumption can be suppressed. Additionally, by preventing the pilot hydraulic pressure from leaking out with the check valve and the sealing material, the switching line can be prevented from being unexpectedly switched due to pressure drop in the supply line. Furthermore, the relief valve suppresses overpressurization in the pilot hydraulic line, so that the electro-hydrostatic circuit can be prevented from being damaged.

Further, it is preferable that the switching valve includes a sleeve on which a plurality of ports are disposed, a spool that is disposed inside the sleeve to move in an axial direction by the pilot hydraulic pressure to switch between the switching lines each serving as a flow channel of the hydraulic fluid that is formed by a combination of the ports, and an energizing unit that energizes the spool against the pilot hydraulic pressure, and the sealing material is disposed between the sleeve and the spool to seal the switching line against the pilot hydraulic line.

With this configuration, the sleeve and the spool can be more preferably sealed, and the pilot hydraulic pressure can be prevented from leaking out.

Further, it is preferable that the switching valve includes a restrictor element, and in the switching valve, the switching lines include a first switching line that causes the supply line that connects the hydraulic supply device to the switching valve to communicate with the supply line that connects the switching valve to the driving part, and a second switching line that causes the two supply lines that connect the switching valve to the driving part to communicate with each other via the restrictor element.

With this configuration, even in an event of a failure such that the hydraulic pressure supplied from the hydraulic supply device is lost, an unstable operation of the driving part can be suppressed.

Further, an aircraft according to the present invention includes: a control surface; and an actuator serving as the driving part that actuates the control surface by using the above-described electro-hydrostatic circuit.

With this configuration, the pilot hydraulic pressure is used for switching the switching valve, and supply of the pilot hydraulic pressure is controlled by the solenoid valve, so that the solenoid valve can be downsized as compared with a case of directly using the solenoid valve for switching the switching valve. Accordingly, the weight of the entire electro-hydrostatic circuit can be reduced, and power consumption can be suppressed. Additionally, by preventing the pilot hydraulic pressure from leaking out with the check valve and the sealing material, the switching line can be prevented from being unexpectedly switched due to pressure drop in the supply line. Furthermore, the relief valve suppresses overpressurization in the pilot relief line, so that the electro-hydrostatic circuit can be prevented from being damaged.

DETAILED DESCRIPTION OF EMBODIMENTS

Figure 1:
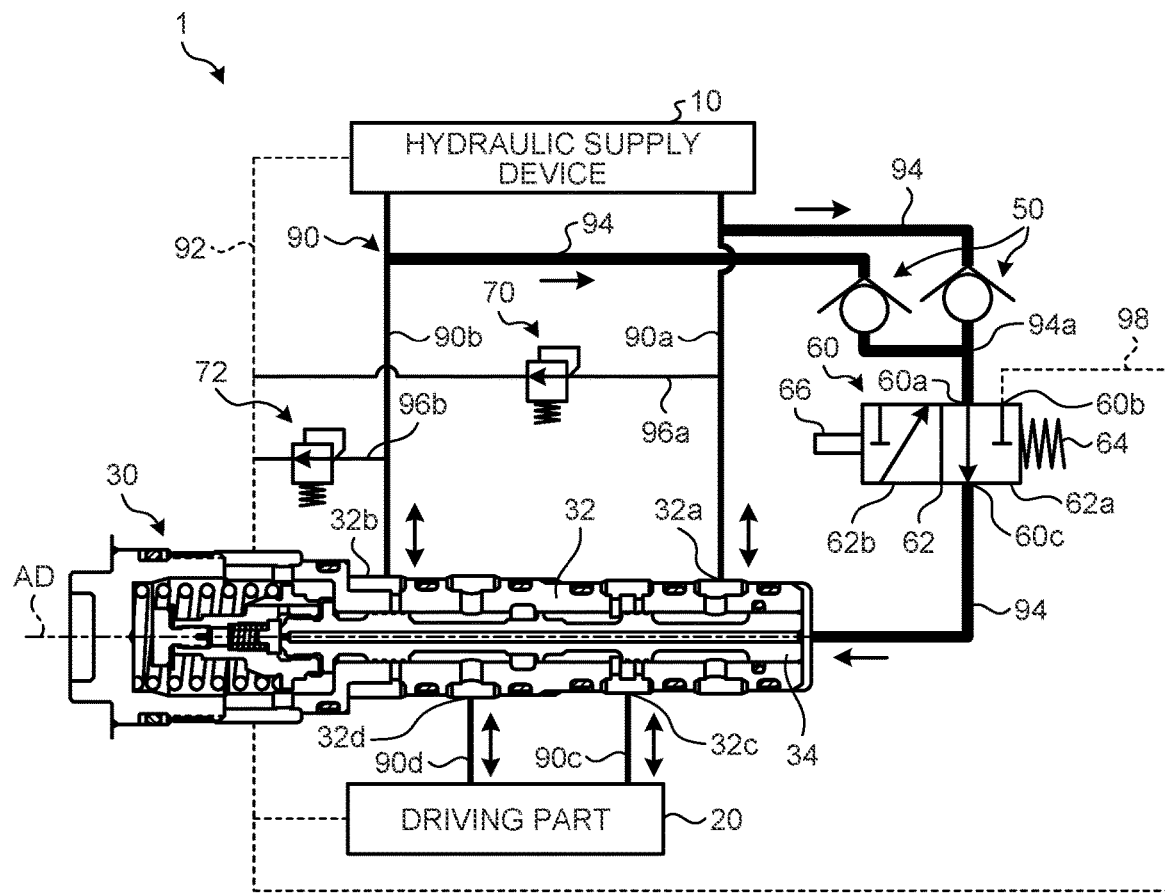
FIG. 1 is a diagram illustrating an electro-hydrostatic circuit according to an embodiment.

The following describes an embodiment of an electro-hydrostatic circuit according to the present invention in detail based on the drawings. The present invention is not limited to this embodiment. Constituent elements in the following embodiment include a constituent element that can be easily replaced by those skilled in the art, or substantially the same constituent element. Furthermore, the constituent elements described below can be appropriately combined with each other. In the following description about the embodiment, the same configuration is denoted by the same reference numeral, and a different configuration is denoted by a different reference numeral.

First, the following describes a configuration of an electro-hydrostatic circuit 1 according to the embodiment with reference to FIG. 1. FIG. 1 is a schematic diagram illustrating the electro-hydrostatic circuit according to the embodiment. The electro-hydrostatic circuit 1 drives a driving part 20 by a hydraulic pressure of hydraulic fluid supplied from a hydraulic supply device 10. The hydraulic supply device 10 is connected to the driving part 20 by a supply line 90 and an auxiliary supply line 92 via a switching valve 30. The supply line 90 includes a first supply line 90a, a second supply line 90b, a third supply line 90c, and a fourth supply line 90d.

The first supply line 90a connects the hydraulic supply device 10 to the switching valve 30. The first supply line 90a branches off to a pilot hydraulic line 94. The first supply line 90a further branches off to a first relief line 96a. The first relief line 96a is connected to the auxiliary supply line 92 via a first relief valve 70. The first relief valve 70 is opened in a case in which a hydraulic pressure of the first supply line 90a exceeds a predetermined value to discharge the hydraulic fluid to the auxiliary supply line 92.

The second supply line 90b connects the hydraulic supply device 10 to the switching valve 30. The second supply line 90b branches off to the pilot hydraulic line 94. The second supply line 90b further branches off to a second relief line 96b. The second relief line 96b is connected to the auxiliary supply line 92 via a second relief valve 72. The second relief valve 72 is opened in a case in which the hydraulic pressure of the second supply line 90b exceeds a predetermined value to discharge the hydraulic fluid to the auxiliary supply line 92.

The third supply line 90c connects the switching valve 30 to the driving part 20. The fourth supply line 90d connects the switching valve 30 to the driving part 20.

The auxiliary supply line 92 passes through an internal space 36a of the switching valve 30 in which a first energizing unit 36 (refer to FIG. 2) (described later) is disposed. The auxiliary supply line 92 may be connected to the third supply line 90c and the fourth supply line 90d. In this case, circulation of the hydraulic fluid from the auxiliary supply line 92 to the third supply line 90c and the fourth supply line 90d is allowed. Additionally, circulation of the hydraulic fluid from the third supply line 90c and the fourth supply line 90d to the auxiliary supply line 92 is blocked.

The pilot hydraulic line 94 is connected to the switching valve 30 via a check valve 50 and a solenoid valve 60. In the embodiment, pilot hydraulic lines 94 respectively branch off from the first supply line 90a and the second supply line 90b, and merge with each other at a merging part 94a to be connected to the switching valve 30.

The hydraulic supply device 10 supplies hydraulic fluid to the first supply line 90a, the second supply line 90b, and the auxiliary supply line 92. The hydraulic supply device 10 includes, for example, an electric motor, and a variable-displacement hydraulic pump that can discharge hydraulic fluid to two paths (the first supply line 90a and the second supply line 90b) in accordance with rotation of the electric motor. The hydraulic supply device 10 further includes, for example, an accumulator that supplies hydraulic fluid to the supply line 90 via the auxiliary supply line 92 in a case in which a flow rate of hydraulic fluid circulating in the supply line 90 is insufficient.

The driving part 20 is driven when the hydraulic fluid is supplied thereto from the third supply line 90c and the fourth supply line 90d. As the driving part 20, for example, an actuator that actuates a control surface of an aircraft is applied. The actuator includes a cylinder, a piston disposed inside the cylinder, and a rod coupled to the piston. The actuator forms a first chamber connected to the third supply line 90c and a second chamber connected to the fourth supply line 90d by the cylinder and the piston. The rod is connected to the control surface. The control surface is configured to be able to be oscillated by the actuator.

The driving part 20 includes a plurality of operation modes. In the embodiment, the operation modes include a normal mode and a damping mode. In the normal mode, the driving part 20 is driven when the hydraulic fluid is supplied thereto from the hydraulic supply device 10 via the supply line 90. In the damping mode, supply of the hydraulic fluid to the driving part 20 from the hydraulic supply device 10 via the supply line 90 is blocked. In this case, the hydraulic fluid is supplied to the third supply line 90c and the fourth supply line 90d via the auxiliary supply line 92. That is, in the actuator in the damping mode, the first chamber communicates with the second chamber via the third supply line 90c, the switching valve 30, and the fourth supply line 90d. In this case, the hydraulic fluid moves between the first chamber and the second chamber due to external force such as an air load of the control surface, and the hydraulic fluid is supplied to the third supply line 90c and the fourth supply line 90d via the auxiliary supply line 92 as needed.

The switching valve 30 is disposed in the supply line 90. The switching valve 30 switches between a plurality of switching lines for the hydraulic fluid supplied to the driving part 20. The switching valve 30 switches between the switching lines by a pilot hydraulic pressure of the hydraulic fluid supplied from the pilot hydraulic line 94. In the embodiment, the switching lines of the switching valve 30 include a first switching line and a second switching line. The first switching line causes pieces of the supply line 90 connecting the hydraulic supply device 10 to the driving part 20 to communicate each other. That is, the first switching line causes the first supply line 90a to communicate with the third supply line 90c. The first switching line causes the second supply line 90b to communicate with the fourth supply line 90d. The second switching line blocks between the first supply line 90a and the third supply line 90c. The second switching line blocks between the second supply line 90b and the fourth supply line 90d. The second switching line causes the third supply line 90c to communicate with the fourth supply line 90d via a restrictor element 30b (refer to FIG. 2) (described later).

The check valve 50 is disposed in the pilot hydraulic line 94. In the embodiment, the check valve 50 is disposed between the first supply line 90a and the merging part 94a. The check valve 50 allows the hydraulic fluid to circulate from the first supply line 90a to the solenoid valve 60. The check valve 50 blocks circulation of the hydraulic fluid from the solenoid valve 60 to the first supply line 90a. In the embodiment, the check valve 50 is disposed between the second supply line 90b and the merging part 94a. The check valve 50 allows the hydraulic fluid to circulate from the second supply line 90b to the solenoid valve 60. The check valve 50 blocks circulation of the hydraulic fluid from the solenoid valve 60 to the second supply line 90b.

The solenoid valve 60 is disposed in the pilot hydraulic line 94 on a downstream side of the two check valves 50 in a circulating direction of the hydraulic fluid with a pilot hydraulic pressure. The solenoid valve 60 changes a supply state of the hydraulic fluid to the switching valve 30. The solenoid valve 60 includes a valve body 62, an energizing unit 64, and an electromagnetic driving part 66.

The valve body 62 selectively connects any one of a supply port 60a and a discharge port 60b to a port 60c on the switching valve side. The supply port 60a communicates with the check valve 50 via the pilot hydraulic line 94. The discharge port 60b communicates with a discharge line 98. The discharge line 98 communicates with the auxiliary supply line 92 and the like. The port 60c on the switching valve side communicates with the switching valve 30 via the pilot hydraulic line 94.

The valve body 62 moves between a supply position 62a for connecting the supply port 60a to the port 60c on the switching valve side and a discharge position 62b for connecting the discharge port 60b to the port 60c on the switching valve side. The energizing unit 64 energizes the valve body 62 to the supply position 62a. In the embodiment, the energizing unit 64 is a compression spring. The electromagnetic driving part 66 is, for example, configured so that a current can be supplied thereto from an external control device. At the time when the current is applied, the electromagnetic driving part 66 moves the valve body 62 to the discharge position 62b against energizing force of the energizing unit 64. In a case in which the valve body 62 is positioned at the supply position 62a, the hydraulic fluid to have the pilot hydraulic pressure is supplied to the switching valve 30. In a case in which the valve body 62 is positioned at the discharge position 62b, the hydraulic fluid can be discharged from the discharge port 60b.

Figure 2:
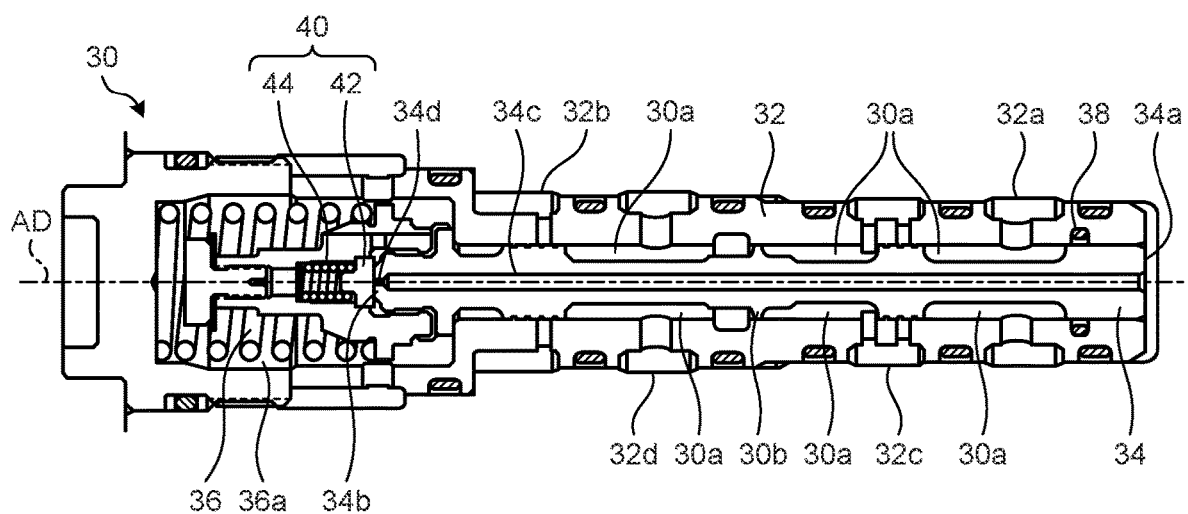
FIG. 2 is a diagram illustrating a switching valve according to the embodiment.

Next, the following describes a detailed configuration of the switching valve 30 with reference to FIG. 2. FIG. 2 is a schematic diagram illustrating the switching valve according to the embodiment. In the embodiment, the switching valve 30 includes a sleeve 32, a spool 34, the first energizing unit 36, a sealing material 38, and a third relief valve 40.

The sleeve 32 has a cylindrical shape as an external shape of the switching valve 30. A plurality of ports are disposed on the sleeve 32. The sleeve 32 includes a first port 32a on a supply side, a second port 32b on the supply side, a first port 32c on the driving part side, and a second port 32d on the driving part side. The first port 32a on the supply side communicates with the hydraulic supply device 10 via the first supply line 90a. The second port 32b on the supply side communicates with the hydraulic supply device 10 via the second supply line 90b. The first port 32c on the driving part side communicates with the driving part 20 via the third supply line 90c. The second port 32d on the driving part side communicates with the driving part 20 via the fourth supply line 90d. A flow channel 30a for the hydraulic fluid is formed by connecting the ports to each other. The flow channel 30a includes a plurality of switching lines.

The spool 34 has a rod shape including a plurality of recessed parts. The recessed part is the flow channel 30a for the hydraulic fluid in the switching valve 30. The spool 34 is disposed inside the sleeve 32. The spool 34 can move in an axial direction AD inside the sleeve 32. One end part 34a of the spool 34 communicates with the pilot hydraulic line 94. The spool 34 is energized toward another end part 34b by the pilot hydraulic pressure of the hydraulic fluid circulating in the pilot hydraulic line 94.

The first energizing unit 36 is disposed on the end part 34b side of the spool 34. The first energizing unit 36 is disposed in the internal space 36a of the switching valve 30. The auxiliary supply line 92 passes through the internal space 36a. The first energizing unit 36 energizes the spool 34 toward the end part 34a against the pilot hydraulic pressure. In the embodiment, the first energizing unit 36 is a compression spring.

In the switching valve 30, the spool 34 moves in the axial direction DA inside the sleeve 32 to switch the switching line for the hydraulic fluid. In a case in which the spool 34 is moved to the end part 34b side by the pilot hydraulic pressure against the energizing force of the first energizing unit 36, the first port 32a on the supply side communicates with the first port 32c on the driving part side, and the second port 32b on the supply side communicates with the second port 32d on the driving part side. That is, the first switching line is opened to cause the first supply line 90a to communicate with the third supply line 90c, and cause the second supply line 90b to communicate with the fourth supply line 90d. In a case in which the spool 34 is moved to the end part 34a side by the energizing force of the first energizing unit 36 against the pilot hydraulic pressure, the first port 32a on the supply side and the second port 32b on the supply side are closed, and the first port 32c on the driving part side communicates with the second port 32d on the driving part side. That is, the second switching line is opened to block between the first supply line 90a and the third supply line 90c, block between the second supply line 90b and the fourth supply line 90d, and cause the third supply line 90c to communicate with the fourth supply line 90d. In the embodiment, the restrictor element 30b is disposed in the flow channel 30a between the first port 32c on the driving part side and the second port 32d on the driving part side communicating with each other in the second switching line.

The sealing material 38 is disposed in the switching valve 30. The sealing material 38 seals the hydraulic fluid with the pilot hydraulic pressure. In the embodiment, the sealing material 38 is disposed between the sleeve 32 and the spool 34. The sealing material 38 seals the flow channel 30a inside the switching valve 30 against the pilot hydraulic line 94. That is, the sealing material 38 seals the switching line of the switching valve 30 against the pilot hydraulic line 94. The sealing material 38 is disposed so that both of the hydraulic fluid circulating in the flow channel 30a and the hydraulic fluid to have the pilot hydraulic pressure do not leak out. The sealing material 38 is preferably disposed in the vicinity of the end part 34a side of the spool 34.

In the embodiment, the spool 34 includes a fine hole 34c and a relief hole 34d. The fine hole 34c is formed along the axial direction AD of the spool 34 from a center on the end part 34a side toward the end part 34b side. The fine hole 34c communicates with the pilot hydraulic line 94 at the end part 34a. The relief hole 34d is formed along the axial direction AD of the spool 34 from the center on the end part 34b side toward the end part 34a side. The relief hole 34d communicates with the fine hole 34c. A diameter of the relief hole 34d is smaller than a diameter of the fine hole 34c. The relief hole 34d discharges the hydraulic fluid to have the pilot hydraulic pressure circulating in the pilot hydraulic line 94 and the fine hole 34c to the outside of the spool 34. In the embodiment, the relief hole 34*d* discharges the hydraulic fluid to the auxiliary supply line 92 via the internal space 36*a* of the switching valve 30.

The third relief valve 40 is disposed in the pilot hydraulic line 94 on the downstream side of the two check valves 50 in the circulating direction. In a case in which the pilot hydraulic pressure of the pilot hydraulic line 94 exceeds a predetermined value, the third relief valve 40 discharges the hydraulic fluid from the pilot hydraulic line 94 to release the pilot hydraulic pressure. In the embodiment, the third relief valve 40 is disposed in the switching valve 30, but may be disposed at any position on the downstream side of the check valves 50 in the circulating direction of the hydraulic fluid.

In the embodiment, the third relief valve 40 is disposed on an inner side of the first energizing unit 36. In the embodiment, the third relief valve 40 includes a valve body 42 and a second energizing unit 44. The valve body 42 is disposed on the end part 34*b* side of the spool 34. The valve body 42 closes the relief hole 34*d*. The valve body 42 metal-touches the relief hole 34*d* of the spool 34. The second energizing unit 44 is disposed on an opposite side of the end part 34*b* side of the spool 34 with respect to the valve body 42. The second energizing unit 44 energizes the valve body 42 to the relief hole 34*d* of the spool 34. In the embodiment, the second energizing unit 44 is a compression spring. In the embodiment, moving directions of the valve body 42 and the second energizing unit 44 are the same direction as the axial direction AD.

Next, the following describes an operation of the switching valve 30. In a case in which the pilot hydraulic pressure in the relief hole 34*d* is equal to or lower than a predetermined value, the valve body 42 closes the relief hole 34*d* against the pilot hydraulic pressure. In a case in which the pilot hydraulic pressure in the relief hole 34*d* exceeds the predetermined value, the valve body 42 opens the relief hole 34*d* against the energizing force of the second energizing unit 44. When the valve body 42 opens the relief hole 34*d*, the hydraulic fluid to have the pilot hydraulic pressure circulating in the pilot hydraulic line 94, the fine hole 34*c*, and the relief hole 34*d* is discharged to the auxiliary supply line 92 via the internal space 36*a* of the switching valve 30.

Next, the following describes an operation of the electro-hydrostatic circuit 1. The electro-hydrostatic circuit 1 can switch the operation mode of the driving part 20 by changing a supply state of the hydraulic fluid at the solenoid valve 60. The supply state of the hydraulic fluid at the solenoid valve 60 can be changed by moving the valve body 62 to the supply position 62*a* or the discharge position 62*b*.

In a case in which the valve body 62 of the solenoid valve 60 is positioned at the supply position 62*a*, the hydraulic fluid is introduced into the pilot hydraulic line 94 from the first supply line 90*a*, and supplied to the switching valve 30 side via the check valve 50, and the supply port 60*a* and the port 60*c* on the switching valve side of the solenoid valve 60. Due to this, the pilot hydraulic pressure of the hydraulic fluid inside the pilot hydraulic line 94 is increased. When the pilot hydraulic pressure of the hydraulic fluid inside the pilot hydraulic line 94 is increased, the hydraulic fluid energizes the spool 34 of the switching valve 30 toward the end part 34*b* side. When the pilot hydraulic pressure of the hydraulic fluid moves the spool 34 toward the end part 34*b* side against the energizing force of the first energizing unit 36, the first switching line of the switching valve 30 is opened. The first switching line causes the first supply line 90*a* to communicate with the third supply line 90*c*, and causes the second supply line 90*b* to communicate with the fourth supply line 90*d*. Thus, the hydraulic fluid supplied from the hydraulic supply device 10 to the supply line 90 is supplied to the driving part 20 via the switching valve 30. Due to this, the driving part 20 is driven in the normal mode.

In a case in which the valve body 62 of the solenoid valve 60 is positioned at the discharge position 62*b*, the hydraulic fluid circulating between the solenoid valve 60 and the switching valve 30 in the pilot hydraulic line 94 is discharged to the discharge line 98 from the pilot hydraulic line 94 via the port 60*c* on the switching valve side and the discharge port 60*b*. Due to this, the pilot hydraulic pressure of the hydraulic fluid inside the pilot hydraulic line 94 is reduced. When the pilot hydraulic pressure of the hydraulic fluid inside the pilot hydraulic line 94 is reduced, the energizing force of the hydraulic fluid energizing the spool 34 of the switching valve 30 toward the end part 34*b* side is reduced. When the first energizing unit 36 moves the spool 34 to the end part 34*a* side against the energizing force of the pilot hydraulic pressure of the hydraulic fluid, the second switching line of the switching valve 30 is opened. The second switching line blocks between the first supply line 90*a* and the third supply line 90*c*, and blocks between the second supply line 90*b* and the fourth supply line 90*d*. The second switching line also causes the third supply line 90*c* to communicate with the fourth supply line 90*d* via the restrictor element 30*b*. Due to this, the driving part 20 is caused to be in the damping mode.

As described above, the electro-hydrostatic circuit 1 according to the embodiment uses the pilot hydraulic pressure for switching the switching valve 30, and controls supply of the pilot hydraulic pressure with the solenoid valve 60, so that the solenoid valve 60 can be downsized as compared with a case of directly using the solenoid valve for switching the switching valve 30. Thus, with the electro-hydrostatic circuit 1, the weight of the entire electro-hydrostatic circuit 1 can be reduced, and power consumption can be suppressed. The electro-hydrostatic circuit 1 can also prevent the switching line from being unexpectedly switched due to pressure drop in the supply line 90 by preventing the pilot hydraulic pressure from leaking out with the check valve 50 and the sealing material 38. Furthermore, the electro-hydrostatic circuit 1 can prevent the electro-hydrostatic circuit 1 from being damaged by suppressing overpressurization in the pilot hydraulic line 94 by the third relief valve 40.

In the electro-hydrostatic circuit 1 according to the embodiment, the switching valve 30 includes: the sleeve 32 on which the ports are disposed; the spool 34 that is disposed inside the sleeve 32, and is moved in the axial direction AD by the pilot hydraulic pressure to switch the switching line as the flow channel 30*a* for the hydraulic fluid that is formed by connecting the ports; and the energizing unit (first energizing unit 36) that energizes the spool 34 against the pilot hydraulic pressure. In the electro-hydrostatic circuit 1, the sealing material 38 is disposed between the sleeve 32 and the spool 34 to seal the switching line (flow channel 30*a*) against the pilot hydraulic line 94, so that the sleeve 32 and the spool 34 can be more preferably sealed, and the pilot hydraulic pressure can be prevented from leaking out.

In the electro-hydrostatic circuit 1 according to the embodiment, the switching valve 30 includes the restrictor element 30*b*. In the electro-hydrostatic circuit 1, the switching lines in the switching valve 30 include the first switching line that causes the supply line 90 (the first supply line 90*a* and the second supply line 90*b*) connecting the hydraulic supply device 10 to the switching valve 30 to communicate with the supply line 90 (the third supply line 90*c* and the fourth supply line 90*d*) connecting the switching valve 30 to the driving part 20, and the second switching line that causes the two supply lines 90 (the third supply line 90c and the fourth supply line 90d) connecting the switching valve 30 to the driving part 20 to communicate with each other via the restrictor element 30b. Due to this, even in an event of a failure such that the hydraulic pressure supplied from the hydraulic supply device 10 is lost, the electro-hydrostatic circuit 1 can suppress an unstable operation of the driving part 20.

In the aircraft including the control surface and the actuator serving as the driving part 20 for actuating the control surface by using the electro-hydrostatic circuit 1 according to the embodiment, the pilot hydraulic pressure is used for switching the switching valve 30 of the electro-hydrostatic circuit 1, and supply of the pilot hydraulic pressure is controlled by the solenoid valve 60. Due to this, in the aircraft, the solenoid valve 60 can be downsized as compared with a case of directly using the solenoid valve for switching the switching valve 30 of the electro-hydrostatic circuit 1. Thus, in the aircraft, the weight of the entire electro-hydrostatic circuit 1 can be reduced, and power consumption can be suppressed. Additionally, in the aircraft, by preventing the pilot hydraulic pressure from leaking out with the check valve 50 and the sealing material 38 of the electro-hydrostatic circuit 1, it is possible to prevent the switching line from being unexpectedly switched due to pressure drop in the supply line 90. Furthermore, in the aircraft, the electro-hydrostatic circuit 1 can be prevented from being damaged by suppressing overpressurization in the pilot hydraulic line 94 by the third relief valve 40 of the electro-hydrostatic circuit 1.

[Modification]

Figure 3:
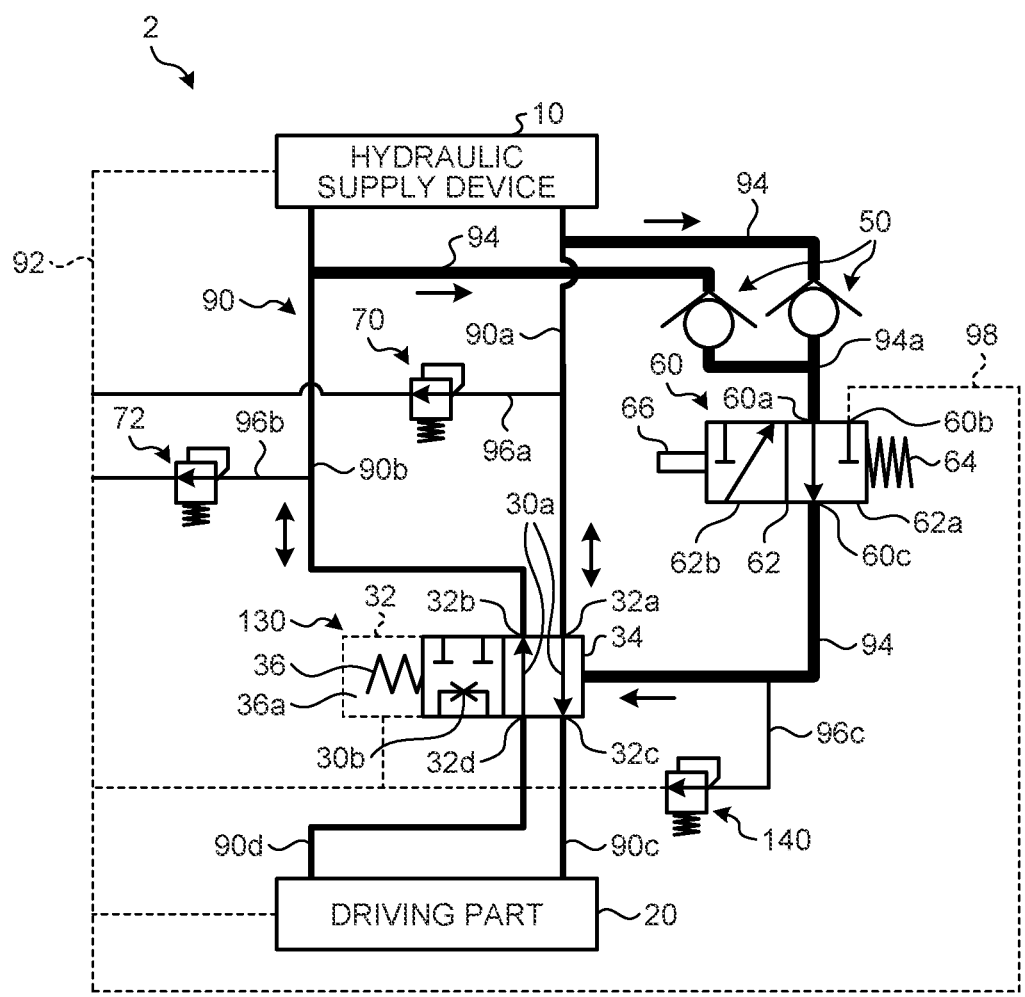
FIG. 3 is a diagram illustrating a modification of the electro-hydrostatic circuit.

FIG. 3 is a diagram illustrating a modification of the electro-hydrostatic circuit. In an electro-hydrostatic circuit 2 illustrated in FIG. 3, the same configuration as that of the electro-hydrostatic circuit 1 illustrated in FIG. 1 is denoted by the same reference numeral, and description thereof will not be repeated. The following describes different configurations. The electro-hydrostatic circuit 2 includes a switching valve 130 and a third relief valve 140 in place of the switching valve 30 and the third relief valve 40 in the electro-hydrostatic circuit 1 in FIG. 1. The electro-hydrostatic circuit 2 further includes a third relief line 96c.

The switching valve 130 is different from the switching valve 30 illustrated in FIG. 2 in that the third relief valve 40, the fine hole 34c, and the relief hole 34d are not disposed therein. In the switching valve 130, the spool 34 moves inside the sleeve 32 to switch the switching line for the hydraulic fluid. In a case in which the spool 34 is moved to the first energizing unit 36 side by the pilot hydraulic pressure of the hydraulic fluid circulating in the pilot hydraulic line 94 against the energizing force of the first energizing unit 36, the first port 32a on the supply side communicates with the first port 32c on the driving part side, and the second port 32b on the supply side communicates with the second port 32d on the driving part side. That is, the first switching line is opened to cause the first supply line 90a to communicate with the third supply line 90c, and cause the second supply line 90b to communicate with the fourth supply line 90d. In a case in which the spool 34 is moved to the pilot hydraulic line 94 side by the energizing force of the first energizing unit 36 against the pilot hydraulic pressure, the first port 32a on the supply side and the second port 32b on the supply side are closed, and the first port 32c on the driving part side communicates with the second port 32d on the driving part side. That is, the second switching line is opened to block between the first supply line 90a and the third supply line 90c, block between the second supply line 90b and the fourth supply line 90d, and cause the third supply line 90c to communicate with the fourth supply line 90d. In the embodiment, the restrictor element 30b is disposed in the flow channel 30a between the first port 32c on the driving part side and the second port 32d on the driving part side communicating with each other in the second switching line.

The third relief valve 140 is disposed in the third relief line 96c. The third relief line 96c branches off from the pilot hydraulic line 94. The third relief line 96c branches off from the pilot hydraulic line 94 on the downstream side of the two check valves 50 in the circulating direction. The third relief line 96c is connected to the auxiliary supply line 92 via the third relief valve 140. In a case in which the pilot hydraulic pressure of the pilot hydraulic line 94 exceeds the predetermined value, the third relief valve 140 discharges the hydraulic fluid from the third relief line 96c to the auxiliary supply line 92 to release the pilot hydraulic pressure. In the embodiment, the third relief line 96c branches off on the downstream side of the solenoid valve 60, but may branch off at any position on the downstream side of the check valves 50 in the circulating direction of the hydraulic fluid.

REFERENCE SIGNS LIST 1, 2 ELECTRO-HYDROSTATIC CIRCUIT
10 HYDRAULIC SUPPLY DEVICE
20 DRIVING PART
30, 130 SWITCHING VALVE
30a FLOW CHANNEL
30b RESTRICTOR ELEMENT
32 SLEEVE
32a FIRST PORT ON SUPPLY SIDE
32b SECOND PORT ON SUPPLY SIDE
32c FIRST PORT ON DRIVING PART SIDE
32d SECOND PORT ON DRIVING PART SIDE
34 SPOOL
34a, 34b END PART
34c FINE HOLE
34d RELIEF HOLE
36 FIRST ENERGIZING UNIT
36a INTERNAL SPACE
38 SEALING MATERIAL
40, 140 THIRD RELIEF VALVE
42 VALVE BODY
44 SECOND ENERGIZING UNIT
50 CHECK VALVE
60 SOLENOID VALVE
60a SUPPLY PORT
60b DISCHARGE PORT
60c PORT ON SWITCHING VALVE SIDE
62 VALVE BODY
62a SUPPLY POSITION
62b DISCHARGE POSITION
64 ENERGIZING UNIT
66 ELECTROMAGNETIC DRIVING PART
70 FIRST RELIEF VALVE
72 SECOND RELIEF VALVE
90 SUPPLY LINE
90a FIRST SUPPLY LINE
90b SECOND SUPPLY LINE
90c THIRD SUPPLY LINE
90d FOURTH SUPPLY LINE
92 AUXILIARY SUPPLY LINE
94 PILOT HYDRAULIC LINE
94a MERGING PART

96a FIRST RELIEF LINE
96b SECOND RELIEF LINE
96c THIRD RELIEF LINE
98 DISCHARGE LINE
AD AXIAL DIRECTION

The invention claimed is:

1. An electro-hydrostatic circuit comprising:
a driving part;
two supply paths; and
a hydraulic supply device including a hydraulic pump configured to discharge hydraulic fluid into the two supply paths according to a rotation of an electric motor, the two supply paths being configured to supply the hydraulic fluid to the driving part and return the hydraulic fluid from the driving part so as to drive the driving part by a hydraulic pressure of the hydraulic fluid supplied from the hydraulic supply device via the two supply paths;
a switching valve connected to the two supply paths and having a plurality of switching lines, the switching valve being configured to switch the hydraulic fluid supplied to the driving part between the plurality of switching lines;
a pilot hydraulic line having a first end connected to each of the two supply paths between the hydraulic supply device and the switching valve, and having a second end connected to the switching valve to supply the switching valve with a pilot hydraulic pressure for switching the hydraulic fluid between the plurality of switching lines;
a check valve disposed in the pilot hydraulic line;
a solenoid valve disposed in the pilot hydraulic line on a downstream side of the check valve in a circulating direction of the hydraulic fluid, the solenoid valve being configured to change a supply state of the hydraulic fluid to the switching valve;
a sealing material in the switching valve to seal the hydraulic fluid with the pilot hydraulic pressure; and
a relief valve disposed in the pilot hydraulic line, the relief valve being located on an opposite side of the check valve with respect to the solenoid valve to release the pilot hydraulic pressure of the pilot hydraulic line.

2. The electro-hydrostatic circuit according to claim 1, wherein the switching valve includes:
a sleeve having a plurality of ports;
a spool disposed inside the sleeve so as to be moveable in an axial direction by the pilot hydraulic pressure to switch between the plurality of switching lines, each of the plurality of switching lines serving as a flow channel of the hydraulic fluid formed by a combination of the ports; and
an energizing unit configured to energize the spool against the pilot hydraulic pressure, and
wherein the sealing material is disposed between the sleeve and the spool to seal the plurality of switching lines against the pilot hydraulic line.

3. The electro-hydrostatic circuit according to claim 1, wherein:
the switching valve includes a restrictor element,
each of the two supply paths having a first supply line connecting the hydraulic supply device to the switching valve, and a second supply line connecting the switching valve to the driving part,
the plurality of switching lines include:
a first switching line configured to allow the first supply line of each of the two supply paths connecting the hydraulic supply device to the switching valve to communicate with the second supply line of a corresponding one of the two supply paths connecting the switching valve to the driving part, and
a second switching line configured to allow the second supply line of each of the two supply paths connecting the switching valve to the driving part to communicate with each other via the restrictor element.

4. An aircraft comprising:
a control surface; and
an actuator serving as the driving part configured to actuate the control surface by using the electro-hydrostatic circuit according to claim 1.

* * * * *